Sept. 9, 1969  J. D. MOORE ET AL  3,465,734
INTAKE MANIFOLD FOR INTERNAL COMBUSTION ENGINES
Filed Nov. 9, 1967

JAMES D. MOORE
ROY T. PALUSKA
INVENTORS
H. M. Saragovitz
BY E. J. Kelly, H. Berl
and M. V. Wallace
ATTORNEYS

United States Patent Office 3,465,734
Patented Sept. 9, 1969

3,465,734
INTAKE MANIFOLD FOR INTERNAL COMBUSTION ENGINES
James D. Moore, East Peoria, and Roy T. Paluska, Washington, Ill., assignors, by mesne assignments, to the United States of America as represented by the Secretary of the Army
Filed Nov. 9, 1967, Ser. No. 681,690
Int. Cl. F02b 75/18; F02f 1/36
U.S. Cl. 123—41.28                    2 Claims

ABSTRACT OF THE DISCLOSURE

An intake manifold having water passages cast integrally therewith for mating with a water manifold for internal combustion engines to overcome the problem where there is not sufficient space between the inlet ports of the inlet manifold to attach the water manifold directly to the cylinder head.

---

This invention relates to intake manifolds and more particularly to a new and improved manifold wherein the water passages are cast integrally therewith for mating with the water manifold to overcome the problem where there is not sufficient space between the inlet ports of the inlet manifold to attach the water manifold directly to the cylinder head.

In the past it was common practice to attach the water manifold directly to the cylinder head. At the present time, due to the many changes in automotive engineering practice, there has not been sufficient space between the inlet ports of the inlet manifold to attach the water manifold directly to the cylinder head.

To remedy this condition there is disclosed herein a new and improved intake manifold for use in combination with an engine having incorporated therewith water passages cast integrally to mate with the water manifold.

The principal object of the present invention is to provide a new and improved intake manifold having incorporated therewith water passages cast integrally therewith for mating with a water manifold.

Another object of the invention is to provide a new and improved engine design wherein is maintained separate fluid passageways in an extremely compact space within said engine.

The above and other objects of the invention will appear more fully from the following more detailed description, and from the drawing wherein.

Figure 1:
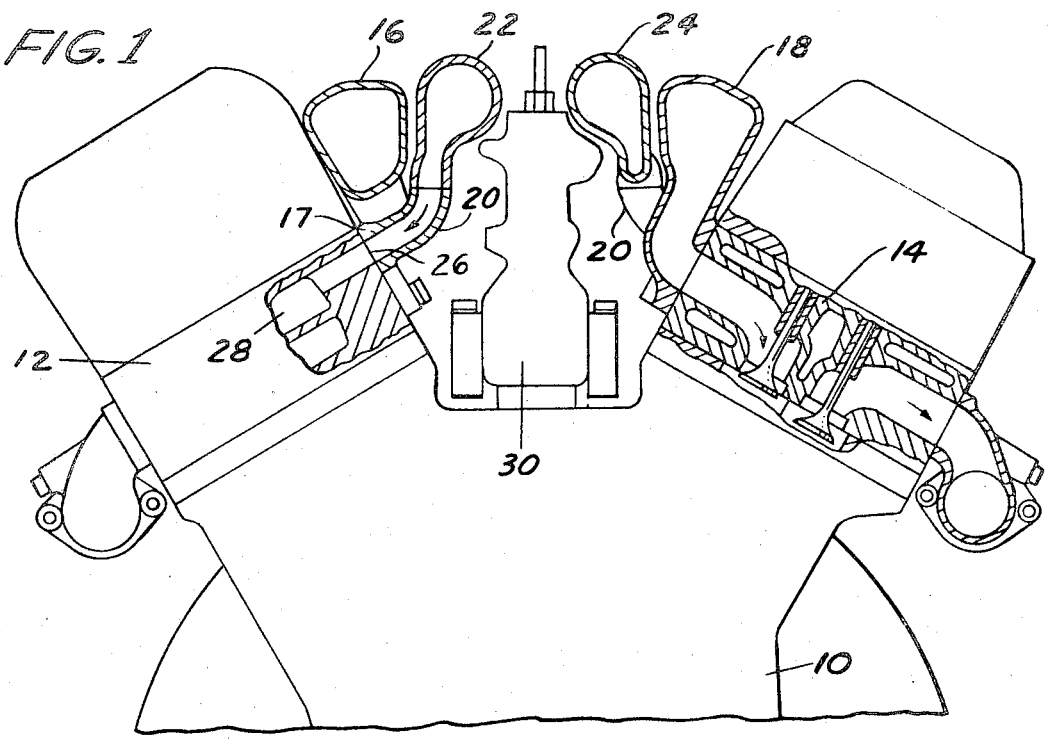
FIG. 1 is a cross section of a V-type internal combustion engine showing the intake manifold with the water passages cast integrally therewith.
Figure 2:
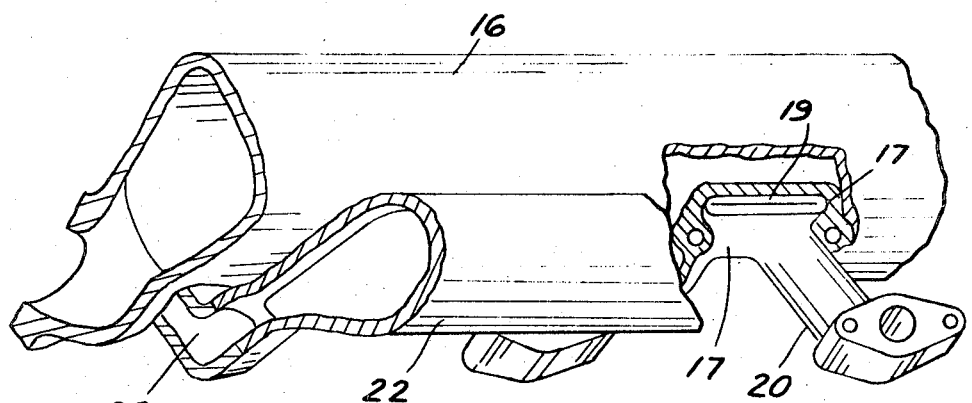
FIG. 2 is a perspective view showing the intake manifold and its connecting water passages and the water manifold.

Referring now to the drawing wherein like reference characters designate like and corresponding parts throughout the several views, there is shown in FIG. 1, an internal combustion engine 10 having opposed cylinder heads 12, 14, mounted thereon to which are attached intake manifolds 16, 18, which in turn have water passages 20 adapted to mate with opposed water manifolds 22, 24. A fuel injection pump 30 is disposed between water manifolds 22, 24. As shown best in FIG. 2, the water passages 20 are cast integrally with intake manifold 16 by means of lateral flange webs 17.

Pipe 20 does not touch the air intake manifold, but is made integral with the intake manifold only by means of the lateral webs 17 which constitute a flange for pipe 20. The opening 19 above the flange 17 is provided to reduce the conducted heat transfer from the cooling fluid to the air intake manifold.

Water manifold 22 is secured to the upper end of water passages 20 and the lower end of water passages 20 mate with opening 26 to allow coolant to pass from the fluid cavities 28 formed in the cylinder heads 12, 14, of engine 10 into the water manifold 22.

Inasmuch as there is not sufficient space between the inlet ports of the intake manifolds 16, 18, to attach the water manifolds 22, 24, directly to the cylinder heads 12, 14, the new and unique manner of attaching same herein disclosed provides a compact unit which in turn solves the problem.

There has been disclosed herein a new and improved intake manifold having water passages cast integrally therewith for mating with a water manifold to overcome the problem where there is not sufficient space between the inlet ports of the inlet manifold to attach the water manifold directly to the cylinder head. This unique arrangement provides a great saving in initial manufacture whereby water passages are formed and cast integrally with the intake manifold and also affords a space saving where there is not sufficient space between the inlet ports of the inlet manifold to attach the water manifold directly to the cylinder head as was the common practice in the past.

The novel intake manifold may be designed to cover a bank of cylinders of an engine, as for instance six cylinders interchangeably on each side of a V-12 engine of the same type as the in line six cylinder engine thereby reducing spare parts requirements as well as reducing manufacturing costs.

We claim:
1. In combination with an internal combustion engine having a cylinder head provided with air intake ports and cooling fluid ports opening on the same flat surface of the cylinder head,
   a casting secured over said openings,
   said casting comprising an air intake manifold and cooling fluid conduits wherein the cooling fluid conduits are joined to the manifold by integral flanges at one end of each conduit,
   said air intake manifold communicating with said air intake ports and said cooling fluid conduits communicating with said cooling fluid ports, and
   wherein the other end of each cooling fluid conduit is attached to a cooling fluid manifold, and
   wherein the integral flanges are joined with the air intake manifold by means of lateral webs providing openings between the flanges and the air intake manifold to reduce heat transfer between the fluid cooling conduit flanges and the air intake manifold.

2. Apparatus comprising the combination of an intake manifold and cooling fluid pipes, wherein the cooling fluid pipe flanges at one end of said pipes are integral with the intake manifold and wherein lateral webs are installed to provide openings between said flanges and said air intake manifold to reduce heat transfer between the fluid cooling conduit flange and the air intake manifold.

References Cited

UNITED STATES PATENTS

| | | |
|---|---|---|
| 1,335,990 | 4/1920 | Short. |
| 1,355,068 | 10/1920 | Vincent. |
| 1,862,723 | 6/1932 | Summers _____ 123—41.74 X |
| 1,985,294 | 12/1934 | Kreis. |
| 2,152,594 | 3/1939 | Klotsch _____ 123—41.28 |
| 3,351,044 | 11/1967 | Pomeroy _____ 123—122 X |

AL LAWRENCE SMITH, Primary Examiner

U.S. Cl. X.R.
123—41.74, 41.82, 52